Jan. 4, 1966  M. J. HILL  3,227,323
DISPENSING APPARATUS FOR WOOD FLOUR AND THE LIKE
Filed July 9, 1964  2 Sheets-Sheet 1

INVENTOR.
MILTON J. HILL
BY Chisholm and Spencer
ATTORNEYS

Jan. 4, 1966 M. J. HILL 3,227,323
DISPENSING APPARATUS FOR WOOD FLOUR AND THE LIKE
Filed July 9, 1964 2 Sheets-Sheet 2

INVENTOR.
MILTON J. HILL
BY Chisholm and Spencer
ATTORNEYS

United States Patent Office 3,227,323
Patented Jan. 4, 1966

3,227,323
DISPENSING APPARATUS FOR WOOD FLOUR
AND THE LIKE
Milton J. Hill, Festus, Mo., assignor to Pittsburgh Plate
Glass Company, Pittsburgh, Pa., a corporation of
Pennsylvania
Filed July 9, 1964, Ser. No. 381,391
7 Claims. (Cl. 222—189)

This invention relates to improvements in material dispensing apparatus and, more specifically, to a novel applicator for dispensing a uniform and uninterrupted flow of powdered or finely divided material onto the upper surface of glass articles that are to be stacked together.

In the manufacture, shipment and/or storage of plate glass, for example, it has heretofore been customary to pack the glass plates by stacking them together with sheets of paper interleaved between the plates. The sheets of paper separate the adjacent glass surfaces from one another, and thereby help to prevent scratching or marring of the surfaces of the plates. However, the use of paper as a separator material has many inherent disadvantages, such as, the costs of materials, materials handling and labor involved at the fabricating location and the costs of labor and disposal involved at the receiving location.

Furthermore, plate glass interleaved with paper does not always lend itself to automatic unloading. This is particularly true where the unloading apparatus involves the use of suction diaphragms. In order for the suction diaphragms to function properly, they must come into contact with the glass surface, or at least must not be separated therefrom by a material, such as paper, which prevents the development of an adequate suction between the diaphragm cups and the glass underlying the paper. Thus, in these cases, it becomes necessary to remove the interleaved paper manually prior to unloading so that the suction diaphragms can effectively be placed in intimate contact with the glass surface.

Also, under certain conditions, if glass is packaged with sheets of paper between the glass plates and the glass plates are stored for any length of time, stain appears on the glass in the area covered by the paper. This stain cannot be removed by any of the usual methods of cleaning, so that even light staining appreciably reduces the market value of the glass, while badly stained glass is not acceptable to the trade at all.

As is disclosed in U.S. Patent No. 2,476,145, it has previously been found that a finely divided material such as wood flour may be advantageously employed as an effective substitute for interleaved paper in the packing or stacking of glass articles. The use of treated or untreated wood flour, or other suitable powdered materials, substantially reduces the expenses attendant with the use of separator materials such as paper, permits the use of pneumatic or suction type glass handling devices and, in certain instances, can be effectively employed to substantially reduce the incidence of staining of the glass during prolonged storage.

However, when such finely divided materials are employed, it has been found that the uniformity and consistency of the coating, as well as control of the quantity of the material put on the glass, is of utmost importance. When stacking a plurality of large glass plates in a horizontal position, a uniform and consistent coating is essential to preventing underlying sheets from being crushed. A tendency to crush or crack underlying sheets will result from the uneven distribution of weight caused by the uneven coating of powdered material. Furthermore, too heavy or too light of a coverage is undesirable. Heavy coatings are expensive and can result in plugging of washer equipment, dirty work areas and plugging of vacuum lines on unloading equipment. Too light of an application can result in sticking of the glass articles and some mechanical damage as a result of rubbing of adjacent glass surfaces.

Various attempts have been made in the past to construct a suitable powdered material dispensing apparatus meeting the requirements of providing a wide range of control over the quantity of material dispensed, while providing a uniform and uninterrupted coating. Some of the methods and devices that have been tried include manual application, roller applicators, dust chambers and air nozzle applicators, as well as vibrating hoppers and vibrating tray applicators. None of the methods or devices tried, however, approach the consistently superior results achieved by the apparatus of the present invention.

According to the present invention, there is provided a novel applicator for dispensing a uniform and uninterrupted flow of a finely divided material, such as wood flour, onto the upper surface of glass bodies that are to be stacked together. The powdered material is fed into a hopper or other suitable receptacle having a foraminous element which effectively forms the floor of said receptacle. A brush and an agitator element are provided to intimately contact the powdered material and dispense it through the foraminous element in a uniform and interrupted flow. Suitable power transmitting means are connected to both the brush and the agitator elements and suitable glass sensing means may also be employed to the end of making the entire material dispensing operation fully automatic.

By employing the apparatus of the present invention, it is possible to dispense a uniform and uninterrupted flow of a powdered material onto the upper surface of a glass article, as well as to effectively control the quantity of the material applied.

These and other objects and advantages of the present invention will become more apparent upon consideration of the accompanying drawings wherein.

Figure 1:
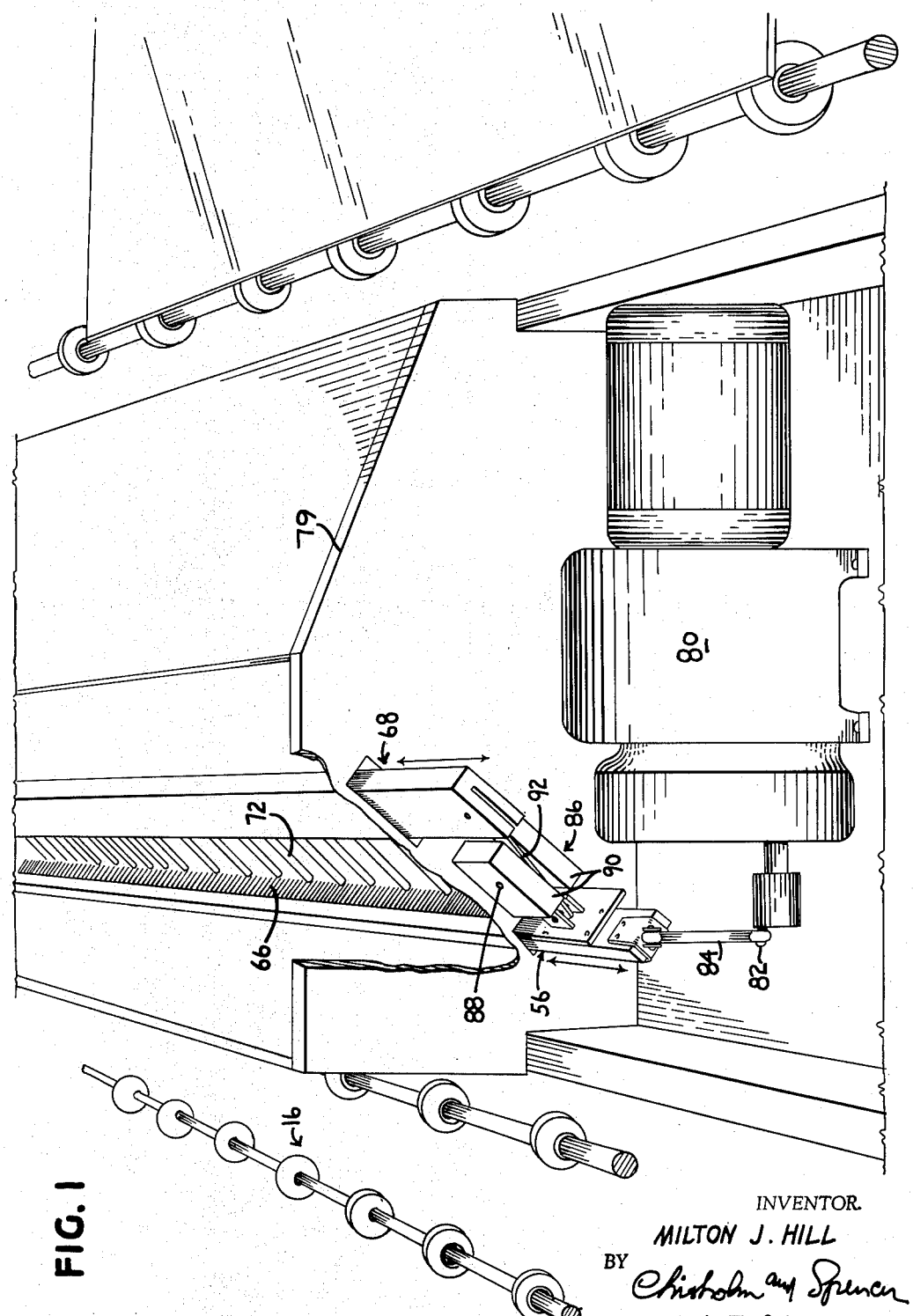
FIG. 1 is a perspective of a typical material dispensing apparatus of the present invention with certain portions thereof cut away or eliminated for the sake of clarity.
Figure 2:
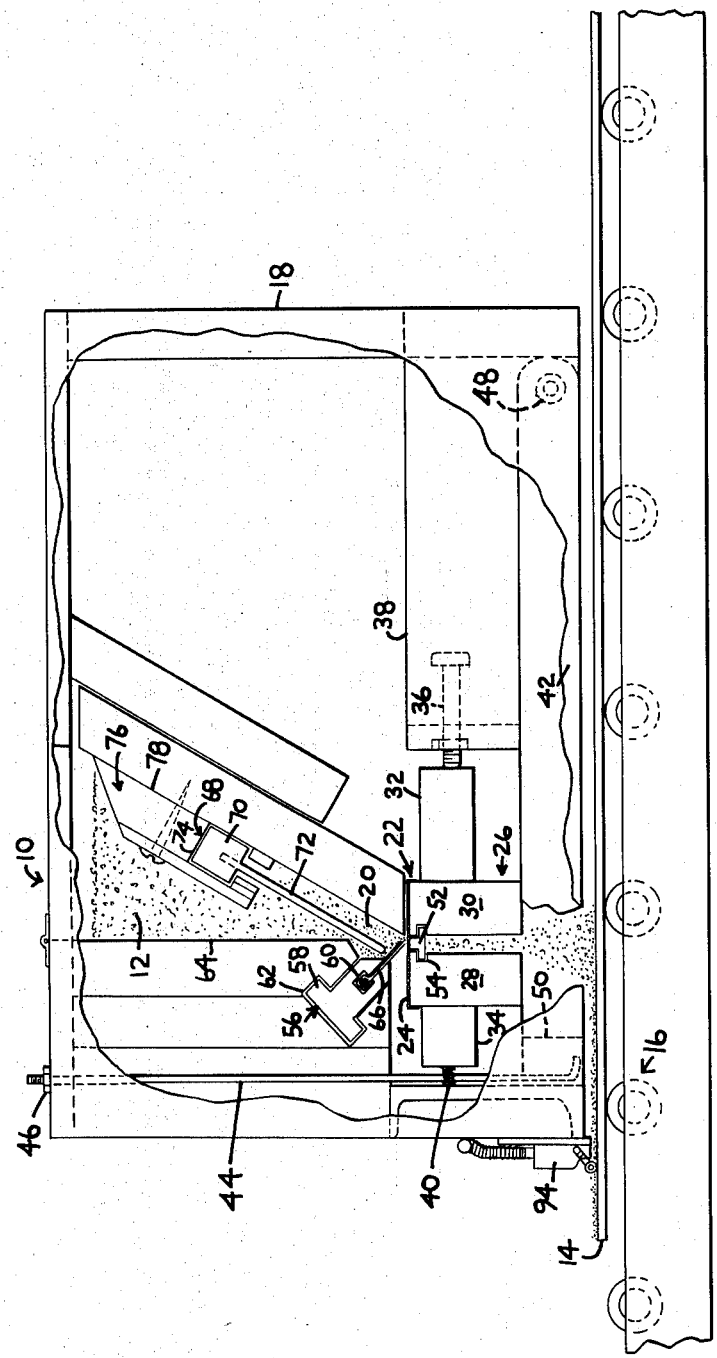
FIG. 2 is a cut-away view in vertical plan of the apparatus of FIG. 1 showing the location of the essential elements comprising the present invention, exclusive of the power transmitting means.

Referring to FIGS. 1 and 2 of the drawings, the apparatus selected for the purpose of illustration includes an elongated material container or hopper 10 adapted to have deposited therein a supply of finely divided or powdered material 12 such as, for example, finely divided wood flour. The powdered material 12 is adapted to be fed therefrom in a uniform and uninterrupted flow for deposit on the upper surface of a glass plate 14 carried therebeneath along and by means of a continuous roller conveyor 16. The hopper 10 is preferably supported by a frame 18 of any suitable construction, and extends in a transverse direction across the full width of the conveyor.

The hopper 10 preferably converges at its lower end into an elongated throat portion 20, which is substantially rectangular in cross-sectional area and open at its bottom. A screen assembly 22, suitably mounted for horizontal and vertical movement, is arranged beneath said throat portion 20, preferably closely adjacent to its open bottom end. The screen assembly 22 essentially comprises a screen or other foraminous member 24 securely attached to the upper surface of an elongated slotted member 26. The slotted member 26 may be formed of two elongated, rectangular members 28 and 30 suitably secured together to provide a slot or separation therebetween, with the slot dimensioned to correspond substantially to the area of the throat portion 20.

As mentioned above, the screen assembly 22 is preferably mounted for horizontal and vertical adjustment. In the particular embodiment shown in FIG. 2, the screen assembly 22 has secured thereto an elongated adjustment bolt abutment member 32 and an elongated spring retaining member 34. Adjustment bolts 36 are threadably inserted through a supporting member 38 attached to the frame 18 and are suitably spaced along the longitudinal dimension of the screen assembly 22. In a similar manner, compression springs 40 are mounted in suitable recesses provided in the spring retaining member 34 at spaced intervals along the longitudinal dimension of the screen assembly 22. When the screen assembly 22 is mounted in its operating position beneath the throat portion 20 of the hopper 10, springs 40 are placed in compression against a flat surface portion of the supporting framework 18, while adjustment bolts 36 are threadably drawn up into intimate contacts with its abutment member 32. Thus, by turning the adjustment bolts 36 in one direction, the screen assembly 22 can be shifted to the left as shown in FIG. 2, while turning the adjustment bolts 36 in the opposite direction causes the screen assembly 22 to be biased to the right.

Vertical adjustment, on the other hand, is accomplished in the particular embodiment shown by means of a U-shaped pivoted member having a pair of pivot arms 42 (one of which is shown) forming the legs of the U, and a number of suitably spaced L-shaped adjustment rods 44, each having an adjustment nut 46 threadably attached thereto. The screen assembly 22 rests at its longitudinal extremities at or near one end of the arms 42, which in turn are rotatably pivoted at their opposite end to the supporting framework 18, as by means of a pivot rod 48. The L-shaped adjustment rods 44 are vertically suspended from the supporting framework 18, and the legs of the rods pass underneath the web member 50 joining the ends of the pivot arms 42 at the end opposite their axis of pivotal attachment. As will be apparent, by means of rotating the adjustment nut 46, the U-shaped pivoted member and, thus, the screen assembly 22 may be adjusted vertically as desired.

In addition to the above adjustments, the screen assembly 22 may also be provided with a slidably removable plate or rod to block off the section of the screen not required for flouring in the event the width of the glass is shorter than the width of the applicator. In the embodiment shown in FIG. 2, a T-shaped rod 52 is preferably employed to block off the section of the screen not required for flouring, by sliding the T-shaped rod 52 directly beneath the screen along guideway 54 provided therefor in screen assembly 22.

An oscillating brush assembly 56 comprising a brush holder 58 supporting a brush member 60 is slidably mounted by means of guideway 62 in one wall 64 of the hopper 10. The brush member 60 is made up of tight rows of sturdy bristles 66, preferably composed of nylon or a like flexible material. The brush member 60 extends downwardly from the brush holder 58 towards the slot formed in the screen assembly 22 and contacts the screen member 24.

An oscillating agitator assembly 68 comprising an agitator holder 70 supporting a plurality of agitator bars or rods 72 is slidably mounted by means of guideway 74 provided in a suitable agitator supporting structure, such as shown at 76 in FIG. 2. The agitator supporting structure 76 is secured to the vertically adjustable wall 78 of the hopper 10 and opposite the wall 64 supporting the oscillating brush assembly 56. The vertically adjustable wall 78 rides in a slot (not shown) provided in each of the end closure plates 79 (one of which is shown in FIG. 1) and in normal position rests on top of the screen assembly 22. As will be appreciated from the above description, the vertically adjustable wall 78, and thus the oscillating agitator assembly 68, are raised and lowered to the same extent as the vertical adjustment performed on the adjustable screen assembly 22. The agitator bars or rods 72 extend downwardly from the agitator holder 70 into close proximity with the slot formed in the screen assembly 22, but out of contact with the screen member 24.

Means is provided to reciprocate or otherwise move the oscillating brush assembly 56 and the oscillating agitator assembly 68. In the disclosed embodiment, the drive means provided for this purpose is a variable speed drive unit 80 having an adjustable clutch arrangement to provide a wide range of speed control. The drive unit 80 is suitably mounted at one end of the hopper 10 and its eccentric shaft 82 is connected by means of a suitable linkage arm 84 to one end of the oscillating brush assembly 56 protruding through end closure plate 79 of hopper 10. An extension of the oscillating agitator assembly 68 also protrudes through the same end closure plate 79. Spaced between the oscillating brush assembly 56 and the oscillating agitator assembly 68 and mounted on the exterior wall of end closure plate 79 is a rocker arm assembly 86. The rocker arm assembly comprises a pivot 88, a pivot support 90 and a lever arm 92. Lever arm 92 is suitably journalled about pivot point 88 at a point equidistant from the ends of lever arm 92, and is also suitably journalled at its ends to the oscillating brush assembly 56 and the oscillating agitator assembly 68. This arrangement permits the oscillating assemblies 56 and 68 to oscillate through the same amplitude and at the same frequency, but in opposite directions to each other. A normally open switch 94 is provided in the path of movement of glass plate 14 and controls the operation of drive unit 80 so that it is only actuated during the interim while a glass plate is passing beneath the material dispensing apparatus.

It should be evident that during the material dispensing operation, at which time the variable speed drive unit 80 is in operation, the oscillating brush assembly 56 brushes the powdered material 12 through the screen 24 and the slotted member 26 onto the surface of the glass plate 14 passing therebeneath. As the oscillating brush assembly 56 is passing across the screen 24 in one direction, the oscillating agitator assembly is passing immediately thereabove in the opposite direction to shear and break up any bridging or caking that may occur in the throat portion 20 of hopper 10. Also, at any time during or between machine operation, various adjustment may be advantageously performed.

The machine is provided with four basic adjustments. One adjustment is the vertical adjustment of the screen assembly 22 to control brush pressure on the screen member 24, as well as to bring the screen assembly 22 closer to the brush assembly 56 as the brush 60 wears. Another adjustment is the horizontal adjustment of the screen assembly 22 at right angles to the direction of movement of the brush 60. As is evident from the above description, this adjustment is actuated by bolts 36 and springs 40 for the purpose of increasing or diminishing the amount of slot width either exposed to the throat portion 20 or concealed beneath the vertically adjustable wall 78 of hopper 10. This adjustment permits varying the quantity of material flow. A third adjustment involves moving the T-shaped rod 52 longitudinally of the screen assembly 22 to avoid unnecessary wate of material 12, while accommodating glass widths less than the width of the applicator. Fnially, the speed of the variable speed unit 80 may be varied at will to increase or decrease the frequency of the brushing action, thereby varying the rate of material flow.

Although the present invention has been described with respect to specific details of certain embodiments thereof, it is not intended that such details serve as limitations upon the scope of the invention except insofar as set forth in the accompanying claims.

What is claimed is:

1. A wood flour dispenser comprising a hopper having a bottom opening, a foraminous member disposed across said opening, a resilient means disposed within said hopper for brushing wood flour through said foraminous member, a second means disposed within said hopper for distributing wood flour evenly along said foraminous member and power transmitting means for reciprocating said last two means along rectilinear paths.

2. A wood flour dispenser comprising a hopper having a bottom opening, a foraminous member disposed across said opening, a resilient brush means disposed within said hopper for brushing wood flour through said foraminous member, an agitator means disposed within said hopper for distributing wood flour evenly along said foraminous member and power transmitting means for reciprocating said resilient brush and said agitator along a rectilinear path and in opposite directions to each other.

3. A wood flour dispenser comprising a frame, a hopper attached to said frame and having a bottom opening, a foraminous member disposed across said opening, means connected to said frame for moving said foraminous member vertically, second means connected to said frame for moving said foraminous member horizontally, means associated with said foraminous member for selectively covering a portion thereof, means disposed within said hopper for brushing wood flour through said foraminous member, means disposed within said hopper for distributing wood flour evenly along said foraminous member, power transmitting means connected to said last two means for reciprocating said last two means in opposite directions and means forming a part of said power transmitting means for varying the frequency of said reciprocation.

4. A powdered material dispensing apparatus comprising a hopper having a bottom opening, a foraminous member disposed across said opening, a resilient means disposed within said hopper for brushing powdered material through said foraminous member, a second means disposed within said hopper for distributing powdered material evenly along said foraminous member and power transmitting means for reciprocating said last two means along rectilinear paths.

5. Apparatus as in claim 4 wherein said resilient means is an elongated brush extending longitudinally of said hopper and in intimate contact with said foraminous member.

6. Apparatus as in claim 5 wherein said second means is an elongated agitator assembly extending longitudinally of said hopper and comprising a holder and a plurality of spaced agitator elements.

7. Apparatus as in claim 4 wherein said power transmitting means is a variable speed drive unit having an eccentric shaft and a linkage connecting said shaft to a rocker arm assembly.

References Cited by the Examiner
UNITED STATES PATENTS

| | | | |
|---|---|---|---|
| 425,334 | 4/1890 | Markham | 209—245 |
| 734,631 | 7/1903 | Stubbs | 222—409 X |
| 1,332,125 | 2/1920 | Hicks | 222—244 X |
| 2,742,867 | 4/1956 | Rhodes | 209—236 X |

ROBERT B. REEVES, *Primary Examiner.*

LOUIS J. DEMBO, *Examiner.*